United States Patent
Metius et al.

(10) Patent No.: US 9,534,265 B2
(45) Date of Patent: Jan. 3, 2017

(54) METHODS AND SYSTEMS FOR PRODUCING DIRECT REDUCED IRON INCORPORATING A CARBON DIOXIDE AND STEAM REFORMER FED BY RECOVERED CARBON DIOXIDE

(71) Applicants: Gary E. Metius, Charlotte, NC (US); Gregory D. Hughes, Charlotte, NC (US); James M. McClelland, Jr., Cornelius, NC (US)

(72) Inventors: Gary E. Metius, Charlotte, NC (US); Gregory D. Hughes, Charlotte, NC (US); James M. McClelland, Jr., Cornelius, NC (US)

(73) Assignee: Midrex Technologies, Inc., Charlotte, NC (US)

(*) Notice: Subject to any disclaimer, the term of this patent is extended or adjusted under 35 U.S.C. 154(b) by 114 days.

(21) Appl. No.: 14/570,135

(22) Filed: Dec. 15, 2014

(65) Prior Publication Data

US 2016/0168653 A1 Jun. 16, 2016

(51) Int. Cl.
| | |
|---|---|
| C21B 13/00 | (2006.01) |
| C21B 13/02 | (2006.01) |
| F27B 1/16 | (2006.01) |
| F27D 17/00 | (2006.01) |

(52) U.S. Cl.
CPC .......... *C21B 13/0073* (2013.01); *C21B 13/02* (2013.01); *F27B 1/16* (2013.01); *F27D 17/002* (2013.01); *F27D 17/008* (2013.01)

(58) Field of Classification Search
CPC ........ C21B 13/0073; C21B 13/02; F27B 1/16; F27D 17/002; F27D 17/008
See application file for complete search history.

(56) References Cited

U.S. PATENT DOCUMENTS

| | | | |
|---|---|---|---|
| 3,844,766 A | 10/1974 | Beggs | |
| 8,747,806 B2* | 6/2014 | Catchpole | C01B 3/382 423/437.1 |
| 2011/0247457 A1 | 10/2011 | Knop et al. | |
| 2013/0171049 A1* | 7/2013 | Metius | C01B 3/384 423/210 |
| 2013/0312571 A1 | 11/2013 | Metius et al. | |
| 2014/0264177 A1 | 9/2014 | Meissner et al. | |

* cited by examiner

*Primary Examiner* — George Wyszomierski
*Assistant Examiner* — Tima M McGuthry Banks
(74) *Attorney, Agent, or Firm* — Clements Bernard PLLC; Christopher L. Bernard; Lawrence A. Baratta, Jr.

(57) ABSTRACT

Methods and systems for producing direct reduced iron (DRI), comprising: generating a syngas stream in a carbon dioxide (CO2) and steam reformer; and providing the syngas stream to a direct reduction (DR) shaft furnace as a reducing gas stream. The methods and systems also comprise combining the syngas stream with a recycled off-gas stream from the DR shaft furnace to form the reducing gas stream. The methods and systems further comprise removing carbon dioxide (CO2) from the recycled off-gas stream from the DR shaft furnace prior to combining it with the syngas stream to form the reducing gas stream. The methods and systems still further comprise feeding CO2 removed from the recycled off-gas stream from the DR shaft furnace to the CO2 and steam reformer. The methods and systems still further comprise feeding recycled off-gas from the recycled off-gas stream from the DR shaft furnace to the CO2 and steam reformer.

22 Claims, 2 Drawing Sheets

METHODS AND SYSTEMS FOR PRODUCING DIRECT REDUCED IRON INCORPORATING A CARBON DIOXIDE AND STEAM REFORMER FED BY RECOVERED CARBON DIOXIDE

FIELD OF THE INVENTION

The present invention relates generally to methods and systems for producing direct reduced iron (DRI). More specifically, the present invention relates to methods and systems for producing DRI incorporating a carbon dioxide (CO2) and steam reformer fed by recovered CO2.

BACKGROUND OF THE INVENTION

U.S. Pat. No. 3,844,766 (BEGGS, PROCESS FOR REDUCING IRON OXIDE TO METALLIC SPONGE IRON WITH LIQUID OR SOLID FUELS) provides an economical process for the direct reduction (DR) of iron ore by the efficient production of a reducing gas when the external source of fuel used in the process is a liquid or solid. A gasifier facility converts a minimal amount of fuel to a gas comprised principally of reductants which is supplemented with reductants reclaimed from the reacted off-gas produced in the reduction process. A controlled amount of water vapor is added to the gas mixture which is heated to approximately reduction furnace temperature before undergoing a shift reaction to equilibrium externally of the furnace to produce a reducing gas having a preferred gas composition.

It is preferable, however, that this process may be modified somewhat, with a CO2 and steam reformer replacing the gasifier and being fed by recovered CO2. Such CO2 and steam reformers are well known to those of ordinary skill in the art, but such use in a DR process is not.

BRIEF SUMMARY OF THE INVENTION

Thus, in various exemplary embodiments, the present invention provides that the gasifier typically associated with the Beggs process is replaced with a CO2 and steam reformer, well known to those of ordinary skill in the art, that is fed scrubbed and cooled off-gas from the shaft furnace and CO2 removed from the scrubbed and cooled off-gas from the shaft furnace by a CO2 removal facility, as well as natural gas from a natural gas source and steam from a steam source. In the CO2 and steam reformer, the feed gas is converted to syngas through a catalytically-driven reforming of natural gas with CO2 and steam. The syngas then joins the stream typically entering the shaft furnace just downstream of the (optional) reactor.

Specifically, in one exemplary embodiment, the present invention provides a method for producing direct reduced iron (DRI), comprising: generating a syngas stream in a carbon dioxide (CO2) and steam reformer; and providing the syngas stream to a direct reduction (DR) shaft furnace as a reducing gas stream. The method also comprises combining the syngas stream with a recycled off-gas stream from the DR shaft furnace to form the reducing gas stream. The method further comprises removing carbon dioxide (CO2) from the recycled off-gas stream from the DR shaft furnace prior to combining it with the syngas stream to form the reducing gas stream. The method still further comprises feeding CO2 removed from the recycled off-gas stream from the DR shaft furnace to the CO2 and steam reformer. The method still further comprises feeding recycled off-gas from the recycled off-gas stream from the DR shaft furnace to the CO2 and steam reformer. The method still further comprises feeding natural gas to the CO2 and steam reformer. The method still further comprises feeding steam to the CO2 and steam reformer. The method still further comprises humidifying the recycled off-gas stream from the DR shaft furnace. The method still further comprises heating the recycled off-gas stream from the DR shaft furnace. Optionally, the method comprises water-gas shift reacting the recycled off-gas stream from the DR shaft furnace. The syngas stream is combined with the recycled off-gas stream from the DR shaft furnace to form the reducing gas stream subsequent to water-gas shift reacting the recycled off-gas stream from the DR shaft furnace.

Similarly, in another exemplary embodiment, the present invention provides a system for producing direct reduced iron (DRI), comprising: a carbon dioxide (CO2) and steam reformer for generating a syngas stream; and a conduit for providing the syngas stream to a direct reduction (DR) shaft furnace as a reducing gas stream. The system also comprises a conduit for combining the syngas stream with a recycled off-gas stream from the DR shaft furnace to form the reducing gas stream. The system further comprises a carbon dioxide (CO2) removal facility for removing CO2 from the recycled off-gas stream from the DR shaft furnace prior to combining it with the syngas stream to form the reducing gas stream. The system still further comprises a conduit for feeding CO2 removed from the recycled off-gas stream from the DR shaft furnace to the CO2 and steam reformer. The system still further comprises a conduit for feeding recycled off-gas from the recycled off-gas stream from the DR shaft furnace to the CO2 and steam reformer. The system still further comprises a conduit for feeding natural gas to the CO2 and steam reformer. The system still further comprises a conduit for feeding steam to the CO2 and steam reformer. The system still further comprises a humidifier for humidifying the recycled off-gas stream from the DR shaft furnace. The system still further comprises a heater for heating the recycled off-gas stream from the DR shaft furnace. Optionally, the system comprises a water-gas shift reactor for water-gas shift reacting the recycled off-gas stream from the DR shaft furnace. The syngas stream is combined with the recycled off-gas stream from the DR shaft furnace to form the reducing gas stream subsequent to water-gas shift reacting the recycled off-gas stream from the DR shaft furnace.

BRIEF DESCRIPTION OF THE DRAWINGS

The present invention is illustrated and described herein within reference to the various drawings, in which like reference numbers are used to denote like method steps/system components, as appropriate, and in which.

DETAILED DESCRIPTION OF THE INVENTION

Figure 1:
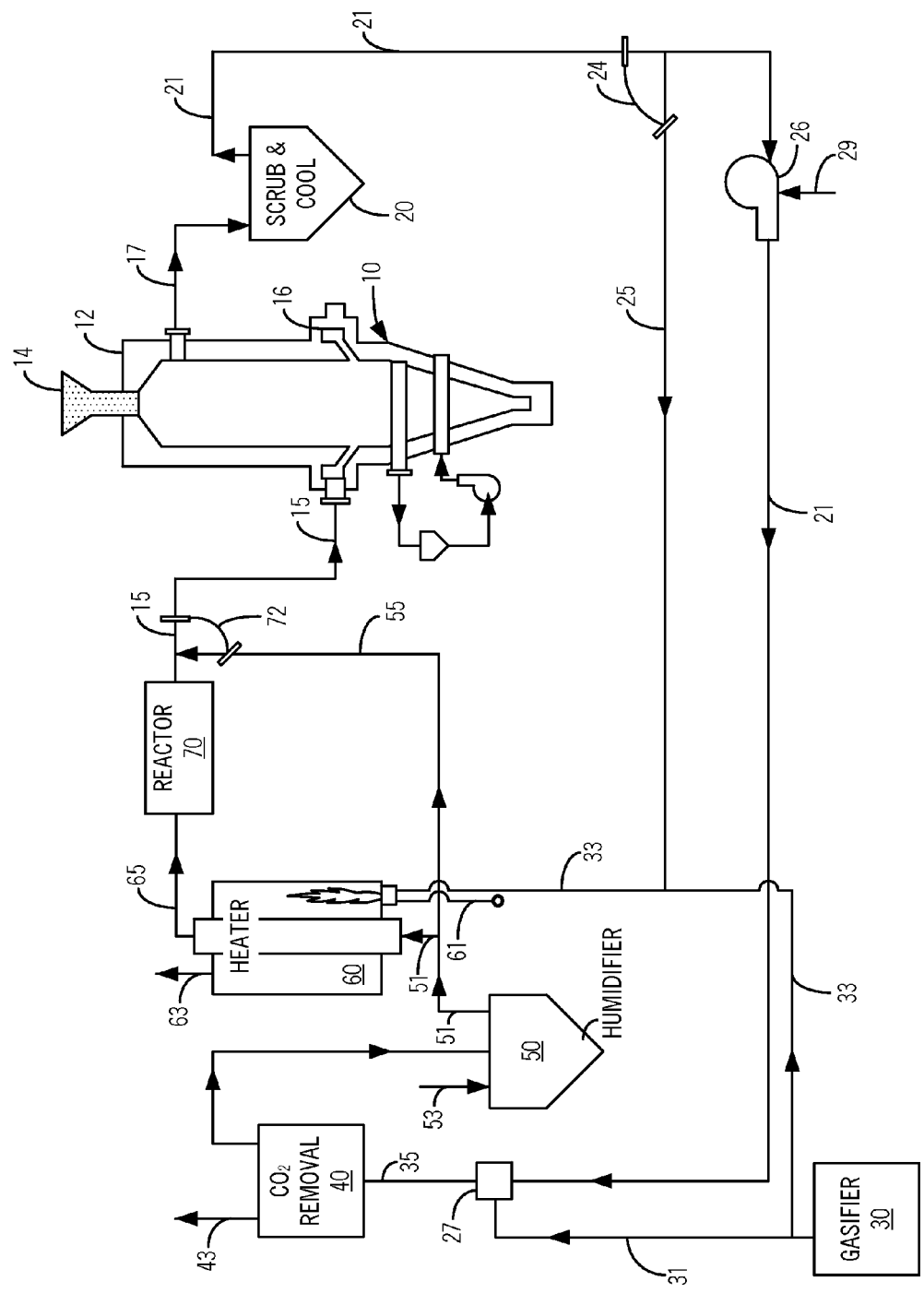
FIG. 1 is a flowsheet illustrating one exemplary embodiment of a DR process utilizing liquid or solid fuels, in accordance with the prior art.

Again, U.S. Pat. No. 3,844,766 provides a process for the DR of iron oxide to metallic iron by a reducing gas externally supplied to a reaction vessel and, more particularly, to such reduction processes which produce at least a portion of the reducing gas from liquid or solid fuels, as opposed to those processes which utilize natural gases as fuels.

This process is particularly applicable to pelletized, lumped, or sized iron ore directly reduced in a vertical shaft furnace. However, it will be appreciated by those of ordinary skill in the art that the process may have broader applications and may be applied to those reduction systems which employ rotary kilns or fluidized beds for the DR of iron ore, for example.

Processes for the DR of iron ore to produce pre-reduced material or sponge iron are well known to those of ordinary skill in the art. Of the many varied processes known, those sponge iron processes which have achieved commercial success and to which this process particularly relates may be defined as systems which supply reducing gas primarily composed of H2 and carbon monoxide (CO) reductants into a furnace, kiln, or fluidized bed to react with the iron oxides in various stages of oxidation to produce metallic iron as the end product. While the fundamental reduction concept in such processes is well known to those of ordinary skill in the art, it has only been more recently that iron ore pellets have been successfully reduced to metallic particles suitable for use as a direct charge in steelmaking plants employing electric furnaces and the like. This success over the last several decades is directly related to the economics of the reduction plant or facility, which in turn is dictated by plant hardware and, importantly, the cost of fuel used in generating a satisfactory reducing gas. More particularly, known installations in existence may generally be characterized by their use of natural gas, principally methane (CH4), as fuel. The CH4 is reacted with oxidants in the reacted off-gas to convert the oxidants and CH4 into reductants. The reductants thus formed are supplemented in volume by the reductants reclaimed from the reacted off-gas. An example of such process is set forth in U.S. Pat. No. 3,748,120 (BEGGS et al., METHOD OF AND APPARATUS FOR REDUCING IRON OXIDE TO METALLIC IRON) which illustrates a continuous, stable process achieved by an indirectly fired catalytic reformer wherein CH4 is reacted with oxidants at relatively low temperature.

The above described processes are necessarily limited in application to geographical areas where gas is in abundance. Where the fuel available is a liquid, such as heavy fuel oil, or a solid, such as coal, known reduction processes could not typically be used simply because there were no proven processes to gasify heavy oil or coal to a CH4-rich gas which, in turn, could be reformed into a reducing gas. The only proven processes for gasifying the above fuels known were total gasification to a reducing type gas composed principally of H2 and CO reductants. Unfortunately, gasifying processes are expensive with their cost almost linearly proportional with the output therefrom. More importantly, operation of the gasifiers produces a gas which is not particularly suitable for DR processes because of the ratio of reductants produced, defined as the gases H2 and CO expressed as H2/CO. To modify the gasifying processes so that the reductant ratio is varied results in an inefficient process which heretofore utilized excessive fuel and was prohibitive in cost.

Thus, the Beggs process provides for the direct reduction of iron ore while minimizing the external source of fuel used to produce a reducing type gas while also providing steps inherent in the process which result in the production of a high quality reducing gas.

The Beggs process achieves this in a system wherein the reacted off-gases are cooled and scrubbed, mixed with reducing type gas produced from known gasifiers using liquid or solid fuel, and passed through a CO2 removal facility. The gas mixture leaving the CO2 removal facility is composed primarily of reductants which are passed through a humidifier where a controlled amount of steam is supplied to the mixture. The gas is then heated and passed through a reactor which permits the gas mixture to undergo a water-gas shift reaction to equilibrium. As a result of this reaction, the reductants contained in the reacted off-gas and produced in the known gasifiers are efficiently utilized in the sense that the reactor reforms one reductant gas into another to achieve a proper reductant ratio.

The temperature of the gas leaving the reactor is approximately at or near the desired temperature of the reducing gas when introduced into the reduction furnace. This not only permits the gas to be introduced directly into the reduction furnace without further heating, but it also prevents water-gas shift reactions from occurring in the reduction furnace. The presence of such reactions in the reduction furnace is significantly detrimental to the efficient operation of the furnace.

Another advantage of the Beggs process is its stability which, in part, occurs because the CO2 removal facility is operable to remove all but a minimal amount of CO2 from the gas mixture prior to heating and reacting the same. This permits the quantity of steam, which can be carefully metered to the mixture, to not only control the desired reductant ratio but also to control the desired reductant/oxidant ratio of the reducing gas as the steam becomes, in converted form, the main source of oxidant in the reducing gas.

Yet another advantage of the Beggs process results from the savings in the use of external fuel required in the process. While the majority of fuel savings is effected because the reacted gas is reclaimed, still further fuel savings results because the sensible heat of the shift reaction is utilized. That is, the heat resulting from the exothermic shift reaction raises the temperature of the gas mixture to permit the heater to operate at a lower temperature than would otherwise be required. Accordingly, the differential in temperature of the gases leaving the heater and reactor respectively represent a savings in fuel.

The Beggs process is illustrated in FIG. 1. The component parts which collectively form the process are individually and by themselves believed to be known to those of ordinary skill in the art and, thus, are not shown or described in detail herein. These parts include a vertical shaft furnace 10, a cooler-scrubber facility 20, a gasifier facility 30, a CO2 removal facility 40, a humidifier 50, a heater 60, and a reactor 70.

The vertical shaft furnace 10 has an upper end 12 into which oxide pellets 14 or other bodies, compacts, or lumps containing iron oxide are fed, the pellets being removed from the bottom end of the furnace 10 as metallic iron. Removed from the furnace upper end 12 is a reducing gas inlet pipe 15 which communicates with a bustle-tuyere arrangement 16 for introducing the gas into the furnace 10. Adjacent furnace upper end portion 12 is a gas off-take line 17 through which spent off-gas or reacted gas exits. A shaft furnace 10 is illustrated and described because of the efficient gas utilization in such a design which results from the countercurrent flow of the reducing gas passing through the oxide pellets 14 as the pellets descend by gravity to the bottom of the furnace 10. Other reduction furnaces known as rotary kilns, batch type, or fluidized bed arrangements may be employed herein in place of shaft furnace 10.

The reacted gas flows through the off-take line 17 and passes to a cooler-scrubber 20 where the gas is cooled and scrubbed of dust. Although cooler-scrubber 20 can be of any conventional type, the preferred type is a direct contact water cooler, such as a counterflow packed tower with gas flowing upwardly and cooling water flowing downwardly by gravity through the packing.

The cooled and cleansed reacted gas leaves the cooler-scrubber 20 through an exit line 21 and a slight amount of this gas as regulated by a suitable pressure control 24 that is bled from exit line 21 to a nitrogen bleed line 25 for purposes which will be explained hereafter. The major portion of the cooled and cleansed reacted gas continues to travel through the exit line 21 and passes through a compressor 26. The compressor 26 sufficiently compresses the gas to a pressure suitable to permit operation of the component parts of the process and seal gas in a line 29 is supplied to the bearings of the compressor 26 to prevent inward leakage of air into the system. The compressed gas continues to travel in the exit line 21 until it reaches a mixing valve 27 where it is mixed with the reducing type gas formed in the gasifier facility 30.

Such gasifier facilities 30 convert fuel, liquid or solid, and preferably fuel oil or coal, to a reducing type gas composed principally of H2 and CO reductant gases. Generally, such facilities utilize oxygen generated from an oxygen plant, steam generated from a steam plant, and fuel which is mixed with the steam and oxygen and injected into a partial oxidation reactor to gasify the fuel. Downstream of the oxidation reactor, known apparatus is provided to scrub the unconverted carbon and remove particles from the gas, such as ash. A CO2 removal facility however need not be provided in the gasifier facility 30 as it is one of the features of the Beggs process is to provide the CO2 removal facility within the closed loop system.

The reducing type gas thus generated in the gasifier facility 30 exits via line 31 with a portion of the gas bled therefrom to a heating line 33 which communicates with a nitrogen bleed line 25 for purposes to be explained hereafter. The major portion of the reducing gas remains in line 30 which communicates with a mixing valve 27; the reducing type gas and cleansed and cooled gas being commingled therein to produce a reducing type gas defined as a first gas mixture. The first gas mixture leaves valve 27 through an amine absorber inlet line 35 and passes through a CO2 removal facility 40. The CO2 removal facility 40 comprises a known amine absorber tower or the like maintained at relatively low temperature which not only separates out CO2 from the first gas mixture but also absorbs some of the hydrogen sulfide (H2S) in the reducing type gas produced in the gasifier facility 30 which exits along with the CO2 through a vent line 43.

The reducing type gas leaves the CO2 removal facility 40 through line 41 and is principally composed of reductants H2 and CO with a residual amount of oxidants water (H2O) and CO2 and other gases, which mixture is defined as a second gas mixture. This second gas mixture enters a humidifier 50 through line 41. The humidifier 50 may comprise a conventional cooler-scrubber such as that shown at 20. However, a source of steam is usually available from the gasifier facility 30 and, thus, it is preferable that the humidifier 50, in essence, comprise a nozzle or nozzles through which a controlled amount of steam in line 53 is injected into the humidifier 50. If desired, line 53 may be provided with a control regulating valve in accordance with gas compositions sensed downstream of the humidifier 50 to control the amount of steam introduced into the second gas mixture (not shown).

The second gas mixture containing a predetermined proportioned amount of steam defines a third gas mixture which exits the humidifier 50 through line 51 and the major portion of the third gas mixture in line 51 enters a heater 60. In the preferred embodiment, the heater 60 contains a plurality of tubes which are indirectly heated by combustibles supplied to the heater 60 from line 33 and the nitrogen bleed line 25 along with combustion air supplied from an air line 61. The spent flue gas is withdrawn from the heater 60 through a flue line 63. The third gas mixture thus heated to a predetermined temperature exits the heater 60 through line 65 and enters a reactor 70. The reactor 70 is a structure of predetermined volume filled with heat resistant, nickel or chrome nickel alloy packing material, such as pall rings and the like which insures a water-gas shift reaction to equilibrium in accordance with the following known equation:

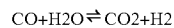

$$CO + H_2O \rightleftharpoons CO_2 + H_2$$

This reaction will occur in the direction indicated because of the absence of CO2 from the third gas mixture and will be at a preferred temperature of approximately 1,500° F. and within the range of 1,400°-1,600° F. for reasons hereafter stated. The heater 60 and reactor 70 thus combine to bring about the above noted reaction which produces a preferred reducing gas as it should be clear that some shift may take place in the heater 60. Thus, it is contemplated that the heater 60 may be designed to provide sufficient residence time for the shift to equilibrium to occur entirely within the heater 60. Alternatively, the heater 60 may be designed to provide reactor tube or tubes which may be filled with a catalyst of an active, metallic type, preferably nickel bearing, and generally comprising nickel deposited on or mixed with alumina carrier to assure shift equilibrium within the heater 60.

For control purposes, it is desired that the temperature of the reducing gas leaving the reactor 70 be slightly higher than the gas temperature introduced into the shaft furnace 10. Thus, a step may be provided in the process to slightly cool the gas to furnace inlet temperature. This may be easily done without significantly affecting the reducing gas composition by bleeding a slight amount of relatively cold gas from humidifier exit line 51 into a cooling line 55 and introducing the same to the gas inlet line 15 downstream of the reactor 70. The amount of cold gas introduced into line 15 from cooling line 55 is easily regulated by a temperature control 72. Alternative cooling steps may include inserting a small cooler-scrubber downstream of the reactor or likewise bleeding a portion of cooled and cleansed reacted gas from line 21. The reducing gas leaving the reactor 70 is thus cooled in gas inlet line 15 to a predetermined temperature and introduced into the bustle and tuyere arrangement 16 for the DR of the iron oxides in the shaft furnace 10.

The Beggs process as described may be characterized as a continuous, closed loop cycle wherein the reacted off-gas is mixed with a reducing type gas produced in a gasifier facility 30 and reformed in a heater 60 to economically produce a reducing gas having an ideal gas composition. This may be better seen from an analysis of calculations tabulated below which show gas compositions and flow rates taken at various locations throughout the process when the process is operated with either fuel oil or coal as an external source of fuel.

TABLE 1

| Gas Sample Locations | FUEL OIL GAS COMPOSITION: | | | | | Flow Rate (NCM/MT) |
|---|---|---|---|---|---|---|
| | CO | $CO_2$ | $H_2$ | $H_2O$ | $N_2$ | |
| Reducing Gas-Line 15 | 0.3337 | 0.0366 | 0.5247 | 0.0581 | 0.0469 | 2067 |
| Reacted Gas-Line 17 | 0.2031 | 0.1673 | 0.3781 | 0.2047 | 0.0469 | 2067 |
| Scrubber-Cooler-Line 21 | 0.2377 | 0.1974 | 0.4424 | 0.0596 | 0.0629 | 1766 |
| Nitrogen Bleed-Line 25 | — | — | — | — | — | 353 |
| Gasifier-Line 31 | 0.4760 | 0.0440 | 0.4460 | 0.0250 | 0.0090 | 882 |
| First Gas Mixture-Line 35 | 0.3293 | 0.1385 | 0.4438 | 0.0463 | 0.0422 | 2295 |
| Flue-Line 43 | — | — | — | — | — | 308 |
| Second Gas Mixture-Line 41 | 0.3857 | 0.0050 | 0.5199 | 0.0400 | 0.0494 | 1959 |
| Steam-Line 53 | — | — | — | — | — | 108 |
| Third Gas Mixture-Line 51 | 0.3656 | 0.0047 | 0.4928 | 0.0900 | 0.0468 | 2067 |

TABLE 2

| Gas Sample Locations | COAL GAS COMPOSITION: | | | | | Flow Rate (NCM/MT) |
|---|---|---|---|---|---|---|
| | CO | $CO_2$ | $H_2$ | $H_2O$ | $N_2$ | |
| Reducing Gas-Line 15 | 0.4104 | 0.0458 | 0.4337 | 0.0489 | 0.0612 | 2080 |
| Reacted Gas-Line 17 | 0.2529 | 0.2034 | 0.3157 | 0.1669 | 0.0612 | 2080 |
| Scrubber-Cooler-Line 21 | 0.2825 | 0.2289 | 0.3527 | 0.0596 | 0.0764 | 1862 |
| Nitrogen Bleed-Line 25 | — | — | — | — | — | 372 |
| Gasifier-Line 31 | 0.5410 | 0.1160 | 0.3040 | 0.0250 | 0.0140 | 958 |
| First Gas Mixture-Line 35 | 0.3837 | 0.1847 | 0.3336 | 0.0461 | 0.0519 | 2447 |
| Flue-Line 43 | — | — | — | — | — | 442 |
| Second Gas Mixture-Line 41 | 0.4764 | 0.0050 | 0.4142 | 0.0400 | 0.0645 | 1971 |
| Steam-Line 53 | — | — | — | — | — | 108 |
| Third Gas Mixture-Line 51 | 0.4515 | 0.0047 | 0.3926 | 0.0900 | 0.0611 | 2080 |

The gas compositions tabulated disclose a preferred reducing gas which will result in optimum efficiency of the reducing furnace as determined by the following criteria:

1. A reductant ratio expressed as H2/CO;
2. A reductant to oxidant ratio expressed as H2+CO/H20+CO2; and
3. A reducing gas temperature introduced at the gas inlet of the shaft furnace.

More particularly, a preferred H2/CO ratio is desired to assure that the heat sensibility of the CO reducing reaction within the shaft furnace 10 which is exothermic is balanced by the H2 reducing reaction within the shaft furnace 10 which is endothermic. That is, a H2/CO ratio greater than unity is desirable so that the H2 reaction predominates to avoid sticking or clustering of the metallic particles, regulate carbon control, and provide a more easily controllable overall process. This reductant ratio has been found to be within the preferred range of 1.0 to 2.0/1. In accordance with the data noted above, a reductant ratio of 1.57/1 and 1.06/1 occurs in the process when fuel oil and coal are used as external sources of fuel, respectively. In this connection, it should be appreciated that the data above is calculated from published analysis which is believed to represent the optimum proportion of H2/CO which can be produced in known gasifiers for a typical heavy oil and a typical high ash coal.

A preferred reductant to oxidant ratio is required to control the carbon content of the metallized end particle and provide a rich reducing gas which is critical to the efficient reduction of wustite to metallic iron in the last reduction step of the shaft furnace. Generally, increasing the reductant to oxidant ratio will result in similar increases in the quality or richness of the reducing gas and the carbon content of the metallized iron. A reducing gas having a reductant/oxidant ratio of approximately 9/1 will result in a carbon content of substantially zero while imparting to the reducing gas sufficient quality or richness to efficiently transform wustite to metallic iron. While a reductant to oxidant ratio less than 9/1 will reduce iron ore to metallic iron, it should be clear that the wustite must be exposed to a greater quantity of such gas to effect such reduction and thus the efficiency of the furnace is adversely affected. On the other hand, it is desirable to supply residual amounts of H2O and CO2 to the reductants in the reducing gas and a balanced equilibrium ratio among one another to prevent water-gas shift reactions from occurring within the shaft furnace. The shift reaction, being exothermic in nature, may among other things raise the temperature of the reducing gas to produce sticking or clustering of the pellets. In the gas compositions noted above, a reductant ratio of 9.06/1 and 8.91/1 occurs in the reducing gas produced from fuel oil and coal, respectively.

The criteria noted above established a balance of the heat sensibilities occurring from endothermic-exothermic metallizing reactions within the shaft furnace for the purpose of preventing clustering or sticking of the pellet particles. With the heat sensibilities thus balanced, the controlling factor which produces the highest rate of reduction while preventing sticking or clustering of the pellets is the temperature of the reducing gas at the inlet to the shaft furnace. This temperature has been determined to be within the range of 1,300°-1,500° F. and preferably is at a temperature of approximately 1,400° F.

Having thus defined the many variables which must be controlled to produce a high quality reducing gas, a brief review of the known prior art may lead to a better appreciation of the Beggs process. As may be verified from the above data, known gasifier facilities believed operating at maximum efficiency to produce the highest ratio of H2 possible, at best provide reductant ratios of 0.6-0.8/1 when the external source of fuel used is coal and 0.8-1.1/1 when the external source of fuel used is oil. If reducing gas, having such reductant ratios characterized as being less than 1, were introduced into the shaft furnace at inlet temperature of 1,400° F., an exothermic reaction would predominate. Assuming this reaction was uniform throughout the cross section of the furnace, sticking of the pellets would occur. Such reducing gas would thus have to be introduced at a lesser temperature and this substantially increases the time that such gas must be in contact with the pellets to reduce same to metallic iron. Thus, a greater quantity of gas must be supplied over a longer time to produce a suitable metallized end product and the efficiency of the shaft furnace is significantly reduced.

In accordance with the Beggs process, the excessive CO in the gas mixture is reacted with a predetermined amount of steam externally of the furnace and at a temperature approximately equal to furnace inlet temperature to produce a reducing gas of preferred composition. The reducing gas does not have to be raised in temperature prior to introduction into the shaft furnace. It is thus one aspect that a reducing gas of preferred composition can be obtained by allowing a water-gas shift reaction to occur in a reactor at a far higher temperature than the temperature, typically 600°–800° F., at which such reactors are typically operated at to produce a maximum amount of H2. Another aspect resides in the absence of water-gas shift reactions within the shaft furnace as such reactions have already occurred to equilibrium externally of the furnace. This results because the ratio of steam to CO2 in the gas mixture prior to reacting same is greater upstream of the reactor than such ratio is downstream of the reactor or within the shaft furnace. Thus, the oxidant ratio of the reducing gas is determined by the steam supplied the gas mixture which may be easily regulated to provide optimum control of the reduction process. Another aspect results in the efficiency obtained by utilization of the heat sensibilities resulting from the exothermic reaction within the water-gas shift reactor. Thus, the heat given off within the reactor permits the gas mixture from the humidifier to be heated to somewhat less than the desired furnace inlet temperature and then passed through the catalytic water-gas shift reactor wherein the shift reaction will cause the gas to be further heated to furnace temperature. Thus, the Beggs process presents an economic process for the direct reduction of iron ore.

Many modifications may be incorporated into such processes without departing from the spirit or essence of the invention. For example, it may be possible to eliminate the humidifier 50 from the process by controlling the steam content which passes through the CO2 removal facility 40 and still reform the gas mixture in the heater 60 to produce a preferred reducing gas composition. Also, while the reducing type gas produced in the heater has been shown to be introduced into inlet line 35 communicating with the CO2 removal facility, it should be apparent that such gas could be introduced into the system at any point downstream of shaft furnace 10 and upstream of the CO2 removal facility.

Figure 2:
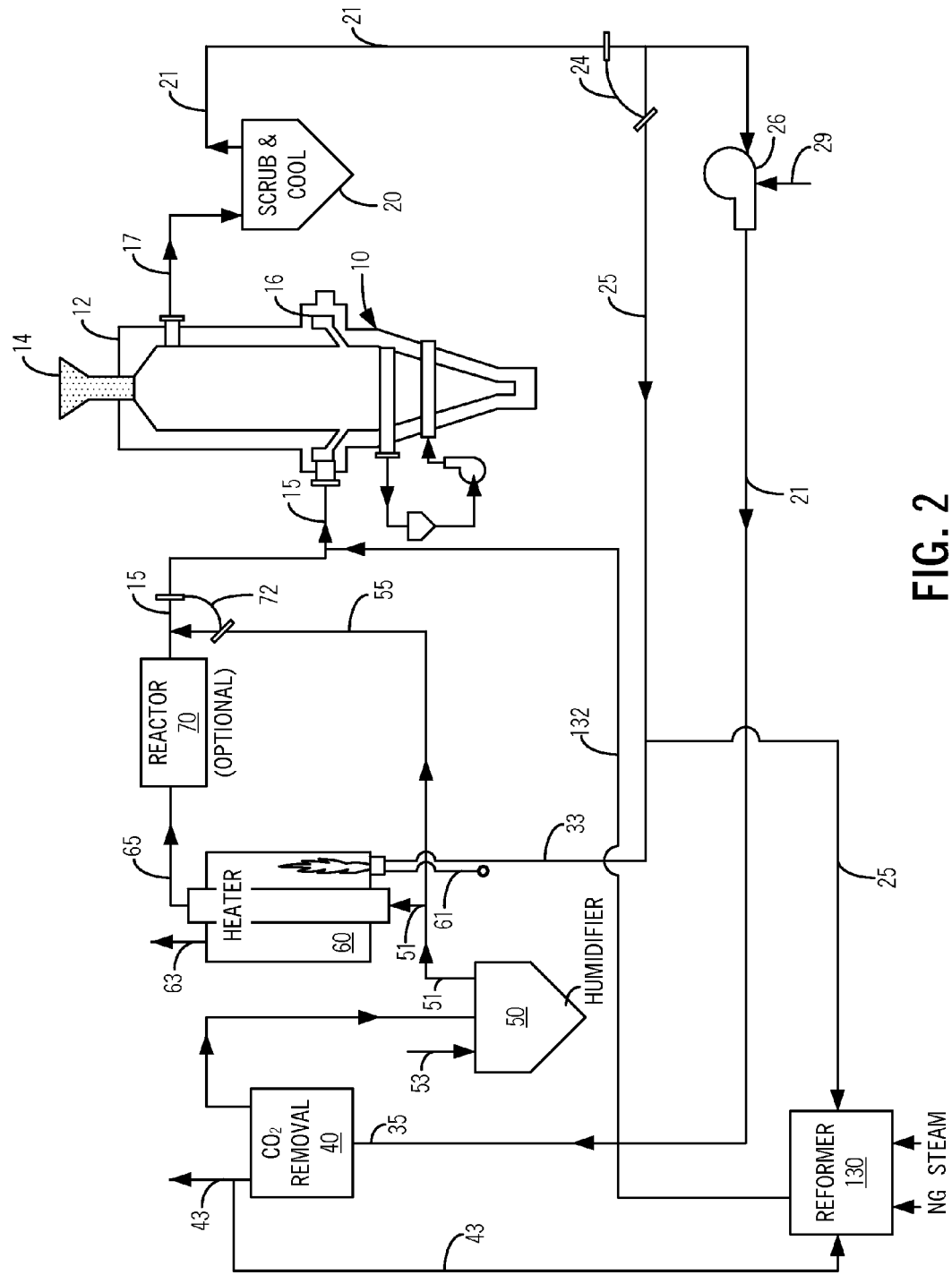
FIG. 2 is a flowsheet illustrating one exemplary embodiment of a DR process utilizing a CO2 and steam reformer that is fed by recovered CO2, in accordance with the present invention.

Referring now specifically to FIG. 2, one especially interesting modification is presented. The gasifier 30 is replaced with a CO2 and steam reformer 130, well known to those of ordinary skill in the art, that is fed scrubbed and cooled off-gas 25 from the shaft furnace 10 and CO2 43 removed from the scrubbed and cooled off-gas 21 from the shaft furnace 10 by the CO2 removal facility 40, as well as natural gas from a natural gas source and steam from a steam source. In the CO2 and steam reformer 130, the feed gas is converted to syngas 132 through a catalytically-driven reforming of natural gas with CO2 and steam. The syngas 132 then joins the stream 15 typically entering the shaft furnace 10 just downstream of the (optional) reactor 70.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method for producing direct reduced iron (DRI), comprising:
   generating a syngas stream in a carbon dioxide (CO2) and steam reformer; and
   providing the syngas stream to a direct reduction (DR) shaft furnace as a reducing gas stream.

2. The method of claim 1, further comprising combining the syngas stream with a recycled off-gas stream from the DR shaft furnace to form the reducing gas stream.

3. The method of claim 2, further comprising removing carbon dioxide (CO2) from the recycled off-gas stream from the DR shaft furnace prior to combining it with the syngas stream to form the reducing gas stream.

4. The method of claim 3, further comprising feeding CO2 removed from the recycled off-gas stream from the DR shaft furnace to the CO2 and steam reformer.

5. The method of claim 2, further comprising feeding recycled off-gas from the recycled off-gas stream from the DR shaft furnace to the CO2 and steam reformer.

6. The method of claim 2, further comprising humidifying the recycled off-gas stream from the DR shaft furnace.

7. The method of claim 2, further comprising heating the recycled off-gas stream from the DR shaft furnace.

8. The method of claim 2, further comprising water-gas shift reacting the recycled off-gas stream from the DR shaft furnace.

9. The method of claim 8, wherein the syngas stream is combined with the recycled off-gas stream from the DR shaft furnace to form the reducing gas stream subsequent to water-gas shift reacting the recycled off-gas stream from the DR shaft furnace.

10. The method of claim 1, further comprising feeding natural gas to the CO2 and steam reformer.

11. The method of claim 1, further comprising feeding steam to the CO2 and steam reformer.

12. A system for producing direct reduced iron (DRI), comprising:
   a carbon dioxide (CO2) and steam reformer for generating a syngas stream; and
   a conduit for providing the syngas stream to a direct reduction (DR) shaft furnace as a reducing gas stream.

13. The system of claim 12, further comprising a conduit for combining the syngas stream with a recycled off-gas stream from the DR shaft furnace to form the reducing gas stream.

14. The system of claim 13, further comprising a carbon dioxide (CO2) removal facility for removing CO2 from the recycled off-gas stream from the DR shaft furnace prior to combining it with the syngas stream to form the reducing gas stream.

15. The system of claim 14, further comprising a conduit for feeding CO2 removed from the recycled off-gas stream from the DR shaft furnace to the CO2 and steam reformer.

16. The system of claim 13, further comprising a conduit for feeding recycled off-gas from the recycled off-gas stream from the DR shaft furnace to the CO2 and steam reformer.

17. The system of claim 12, further comprising a conduit for feeding natural gas to the CO2 and steam reformer.

18. The system of claim 12, further comprising a conduit for feeding steam to the CO2 and steam reformer.

19. The system of claim 12, further comprising a humidifier for humidifying the recycled off-gas stream from the DR shaft furnace.

20. The system of claim 12, further comprising a heater for heating the recycled off-gas stream from the DR shaft furnace.

21. The system of claim 12, further comprising a water-gas shift reactor for water-gas shift reacting the recycled off-gas stream from the DR shaft furnace.

22. The system of claim 21, wherein the syngas stream is combined with the recycled off-gas stream from the DR shaft furnace to form the reducing gas stream subsequent to water-gas shift reacting the recycled off-gas stream from the DR shaft furnace.

* * * * *